United States Patent
Nishioka et al.

(10) Patent No.: US 12,510,850 B2
(45) Date of Patent: Dec. 30, 2025

(54) BELT MEMBER FOR ELECTROPHOTOGRAPHIC APPARATUS

(71) Applicant: Sumitomo Riko Company Limited, Aichi (JP)

(72) Inventors: Hironari Nishioka, Aichi (JP); Sho Sakamoto, Aichi (JP); Yasuhide Watanabe, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/970,905

(22) Filed: Dec. 6, 2024

(65) Prior Publication Data
US 2025/0093799 A1 Mar. 20, 2025

Related U.S. Application Data

(63) Continuation of application No. PCT/JP2023/032081, filed on Sep. 1, 2023.

(30) Foreign Application Priority Data

Sep. 27, 2022 (JP) .................... 2022-153208

(51) Int. Cl.
*G03G 15/16* (2006.01)
*C08G 18/38* (2006.01)
(Continued)

(52) U.S. Cl.
CPC .......... *G03G 15/162* (2013.01); *C08G 18/38* (2013.01); *C08G 18/6279* (2013.01);
(Continued)

(58) Field of Classification Search
CPC .......... G03G 15/162; G03G 15/2057; G03G 15/6529; C08G 18/38; C08G 18/6279; C08G 18/73
See application file for complete search history.

(56) References Cited

U.S. PATENT DOCUMENTS

2019/0271927 A1* 9/2019 Inoue ................. G03G 9/08795
2020/0010605 A1* 1/2020 Yoshizawa ......... C08G 18/6279
(Continued)

FOREIGN PATENT DOCUMENTS

| JP | 2008094605 | 4/2008 |
|---|---|---|
| JP | 2011073804 | 4/2011 |
| WO | 2022071224 | 4/2022 |

OTHER PUBLICATIONS

"International Search Report (Form PCT/ISA/210) of PCT/JP2023/032081", mailed on Oct. 24, 2023, with English translation thereof, pp. 1-4.

*Primary Examiner* — Joseph S Wong
(74) *Attorney, Agent, or Firm* — JCIPRNET (57) ABSTRACT

A belt member 10 for an electrophotographic apparatus has: a surface layer 14 provided on an outer circumferential surface of a tubular base layer 12, the surface layer serving as a cured resin composition including: for 100 parts by mass of a fluorine resin having a hydroxyl group, 10 or more and 30 or less parts by mass or less of an isocyanate curing agent having isocyanate groups at both ends and having a molecular weight of 600 g/mol or more and 4000 g/mol or less or 5 or more and 18 or less parts by mass of an isocyanate curing agent having an isocyanate group at a single end; and 5 or more and 10 or less parts by mass of a fluorine-based surfactant, and 1.0 or more and 5 or less parts by mass of a silane coupling agent having an amino group or an isocyanate group.

8 Claims, 1 Drawing Sheet

(51) Int. Cl.
*C08G 18/62* (2006.01)
*C08G 18/73* (2006.01)
*G03G 15/00* (2006.01)
*G03G 15/20* (2006.01)

(52) U.S. Cl.
CPC ......... *C08G 18/73* (2013.01); *G03G 15/2057* (2013.01); *G03G 15/6529* (2013.01)

(56) References Cited

U.S. PATENT DOCUMENTS

2023/0219777 A1    7/2023  Nishioka et al.
2023/0236528 A1*   7/2023  Tanemura ............ G03G 15/162
                                                399/308

* cited by examiner

BELT MEMBER FOR ELECTROPHOTOGRAPHIC APPARATUS

CROSS-REFERENCE TO RELATED APPLICATION

This application is a continuation of PCT International Application No. PCT/JP2023/032081, filed on Sep. 1, 2023, which claims priority under 35 U.S.C. § 119(a) to Japanese Patent Application No. 2022-153208, filed on Sep. 27, 2022. Each of the above application(s) is hereby expressly incorporated by reference, in its entirety, into the present application.

BACKGROUND

Technical Field

The disclosure relates to a belt member for an electrophotographic apparatus, and more specifically to a belt member for an electrophotographic apparatus, such as a transport belt or an intermediate transfer belt.

Description of Related Art

In belt members for electrophotographic apparatuses, such as transport belts or intermediate transfer belts, various technologies are known to improve slidability with cleaning blades, such as the technique of laminating a polyimide-based paint on the surface of a polyimide-based base layer, the technique of laminating a fluorine tube, the technique of laminating thermosetting fluorine resin to which a silicone-based lubricant is added.

PRIOR ART DOCUMENT(S)

Patent Document(s)

[Patent Document 1] Japanese Patent Application Laid-Open No. 2008-094605
[Patent Document 2] Japanese Patent Application Laid-Open No. 2011-073804
[Patent Document 3] International Publication No. WO2022/071224

The belt member is subjected to tensile forces from two axes. As a result, in the cases of long-term storage, prolonged use, etc., wrinkles or undulations may occur on the surface of the belt member, and paper transport failures during use may occur. Additionally, since the belt member is in contact with a cleaning blade, prolonged use may result in a noise, that is, a sliding noise between the belt member and the cleaning blade. Furthermore, if the sealing force between the base layer and the surface layer of the belt member is insufficient, the surface layer may be peeled off.

The disclosure provides a belt member for an electrophotographic apparatus that suppresses the occurrence of wrinkles and undulations during long-term storage and use, reduces sliding noise with the cleaning blade, has a favorable appearance, and has favorable sealing properties between the surface layer and the base layer.

SUMMARY

A belt member for an electrophotographic apparatus according to an aspect of the disclosure includes a base layer and a surface layer. The base layer has a tubular shape, and the surface layer is formed on an outer circumferential surface of the base layer. The base layer contains at least one of polyimide and polyamideimide. The surface layer is configured as a cured product of a resin composition containing a fluorine resin having a hydroxyl group, an isocyanate curing agent, a fluorine-based surfactant, and a silane coupling agent having an amino group or an isocyanate group. The isocyanate curing agent has isocyanate groups at both ends and has a molecular weight of 600 g/mol or more and 4000 g/mol or less. With respect to 100 parts by mass of the fluorine resin, the isocyanate curing agent is 10 parts by mass or more and 30 parts by mass or less, the fluorine-based surfactant is 5 parts by mass or more and 10 parts by mass or less, and the silane coupling agent is 1.0 parts by mass or more and 5 parts by mass or less.

In addition, a belt member for an electrophotographic apparatus according to another aspect of the disclosure includes a base layer and a surface layer. The base layer has a tubular shape, and the surface layer is formed on an outer circumferential surface of the base layer. The base layer contains at least one of polyimide and polyamideimide. The surface layer is configured as a cured product of a resin composition containing a fluorine resin having a hydroxyl group, an isocyanate curing agent, a fluorine-based surfactant, and a silane coupling agent having an amino group or an isocyanate group. The isocyanate curing agent has an isocyanate group at a single end. With respect to 100 parts by mass of the fluorine resin, the isocyanate curing agent is 5 parts by mass or more and 18 parts by mass or less, the fluorine-based surfactant is 5 parts by mass or more and 10 parts by mass or less, and the silane coupling agent is 1.0 parts by mass or more and 5 parts by mass or less.

DESCRIPTION OF THE EMBODIMENTS

A belt member for an electrophotographic apparatus according to an aspect of the disclosure includes a base layer and a surface layer. The base layer has a tubular shape, and the surface layer is formed on an outer circumferential surface of the base layer. The base layer contains at least one of polyimide and polyamideimide. The surface layer is configured as a cured product of a resin composition containing a fluorine resin having a hydroxyl group, an isocyanate curing agent, a fluorine-based surfactant, and a silane coupling agent having an amino group or an isocyanate group. The isocyanate curing agent has isocyanate groups at both ends and has a molecular weight of 600 g/mol or more and 4000 g/mol or less. With respect to 100 parts by mass of the fluorine resin, the isocyanate curing agent is 10 parts by mass or more and 30 parts by mass or less, the fluorine-based surfactant is 5 parts by mass or more and 10 parts by mass or less, and the silane coupling agent is 1.0 parts by mass or more and 5 parts by mass or less.

In addition, a belt member for an electrophotographic apparatus according to another aspect of the disclosure includes a base layer and a surface layer. The base layer has a tubular shape, and the surface layer is formed on an outer circumferential surface of the base layer. The base layer contains at least one of polyimide and polyamideimide. The surface layer is configured as a cured product of a resin composition containing a fluorine resin having a hydroxyl group, an isocyanate curing agent, a fluorine-based surfactant, and a silane coupling agent having an amino group or an isocyanate group. The isocyanate curing agent has an isocyanate group at a single end. With respect to 100 parts by mass of the fluorine resin, the isocyanate curing agent is 5 parts by mass or more and 18 parts by mass or less, the fluorine-based surfactant is 5 parts by mass or more and 10 parts by mass or less, and the silane coupling agent is 1.0 parts by mass or more and 5 parts by mass or less.

A fluorine content of the fluorine-based surfactant may be 10% by mass or more and 30% by mass or less. A dynamic friction coefficient and a static friction coefficient after 500 trials of abrasion test may be 0.5 or less.

(1) A belt member for an electrophotographic apparatus according to an aspect of the disclosure includes a base layer and a surface layer. The base layer has a tubular shape, and the surface layer is formed on an outer circumferential surface of the base layer. The base layer contains at least one of polyimide and polyamideimide. The surface layer is configured as a cured product of a resin composition containing a fluorine resin having a hydroxyl group, an isocyanate curing agent, a fluorine-based surfactant, and a silane coupling agent having an amino group or an isocyanate group. The isocyanate curing agent has isocyanate groups at both ends and has a molecular weight of 600 g/mol or more and 4000 g/mol or less. With respect to 100 parts by mass of the fluorine resin, the isocyanate curing agent is 10 parts by mass or more and 30 parts by mass or less, the fluorine-based surfactant is 5 parts by mass or more and 10 parts by mass or less, and the silane coupling agent is 1.0 parts by mass or more and 5 parts by mass or less.

(2) In addition, a belt member for an electrophotographic apparatus according to another aspect of the disclosure includes a base layer and a surface layer. The base layer has a tubular shape, and the surface layer is formed on an outer circumferential surface of the base layer. The base layer contains at least one of polyimide and polyamideimide. The surface layer is configured as a cured product of a resin composition containing a fluorine resin having a hydroxyl group, an isocyanate curing agent, a fluorine-based surfactant, and a silane coupling agent having an amino group or an isocyanate group. The isocyanate curing agent has an isocyanate group at a single end. With respect to 100 parts by mass of the fluorine resin, the isocyanate curing agent is 5 parts by mass or more and 18 parts by mass or less, the fluorine-based surfactant is 5 parts by mass or more and 10 parts by mass or less, and the silane coupling agent is 1.0 parts by mass or more and 5 parts by mass or less.

(3) In (1) or (2), a fluorine content of the fluorine-based surfactant may be 10% by mass or more and 30% by mass or less.

(4) In any one of (1) to (3), a dynamic friction coefficient and a static friction coefficient after 500 trials of abrasion test may be 0.5 or less.

In the belt member for an electrophotographic apparatus according to an embodiment of the disclosure, the surface layer is configured as a cured product of a resin composition containing a fluorine resin having a hydroxyl group, an isocyanate curing agent, a fluorine-based surfactant, and a silane coupling agent having an amino group or an isocyanate group, the isocyanate curing agent has isocyanate groups at both ends and has a molecular weight of 600 g/mol or more and 4000 g/mol or less, and with respect to 100 parts by mass of the fluorine resin, the isocyanate curing agent is 10 parts by mass or more and 30 parts by mass or less, the fluorine-based surfactant is 5 parts by mass or more and 10 parts by mass or less, and the silane coupling agent is 1.0 parts by mass or more and 5 parts by mass or less. Therefore, the occurrence of wrinkles and undulations during long-term storage and use is suppressed, sliding noise of the cleaning blade is suppressed, a favorable appearance is rendered, and favorable sealing properties between the surface layer and the base layer are rendered.

In addition, in the belt member for an electrophotographic apparatus according to another embodiment of the disclosure, the surface layer is configured as a cured product of a resin composition containing a fluorine resin having a hydroxyl group, an isocyanate curing agent, a fluorine-based surfactant, and a silane coupling agent having an amino group or an isocyanate group, the isocyanate curing agent has an isocyanate group at a single end, and with respect to 100 parts by mass of the fluorine resin, the isocyanate curing agent is 5 parts by mass or more and 18 parts by mass or less, the fluorine-based surfactant is 5 parts by mass or more and 10 parts by mass or less, and the silane coupling agent is 1.0 parts by mass or more and 5 parts by mass or less.

Therefore, the occurrence of wrinkles and undulations during long-term storage and use is suppressed, sliding noise of the cleaning blade is suppressed, a favorable appearance is rendered, favorable sealing properties between the surface layer and the base layer are rendered.

When the isocyanate curing agent has isocyanate groups at both ends and the molecular weight thereof is 600 g/mol or more and 4000 g/mol or less, the surface layer becomes flexible, and the occurrence of wrinkles and undulations during long-term storage and use can be suppressed.

Additionally, when the isocyanate curing agent has an isocyanate group at a single end, the surface layer becomes flexible, and the occurrence of wrinkles and undulations during long-term storage and use can be suppressed.

Moreover, when the fluorine content of the fluorine-based surfactant is 10% by mass or more and 30% by mass or less, the sliding property of the surface layer is increased, resulting in an excellent effect of suppressing the sliding noise of the cleaning blade.

In addition, when the dynamic friction coefficient and static friction coefficient after 500 trials of abrasion test are 0.5 or less, the surface layer exhibits excellent sliding property, and the effect of suppressing the sliding noise of the cleaning blade is superior.

A belt member for an electrophotographic apparatus (may be briefly referred to as "belt member" in the following) according to the disclosure will be described in detail. The belt member includes an elastic layer and a surface layer formed on the outer circumferential surface of the elastic layer. The belt member is suitable to serve as an endless belt, etc., such as an intermediate transfer belt, a paper-transfer transport belt, a fixing belt, etc., used in an electrophotographic apparatus that adopts an electrophotographic system, such as a copier, a printer, a facsimile machine.

Figure 1:
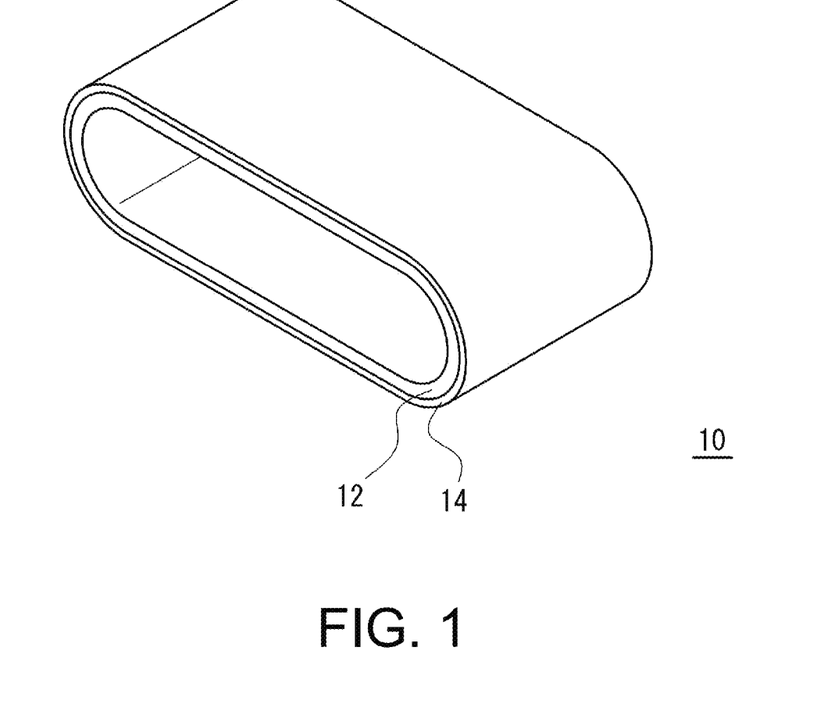
FIG. 1 is a perspective view schematically showing a belt member for an electrophotographic apparatus according to an embodiment of the disclosure.
Figure 2:
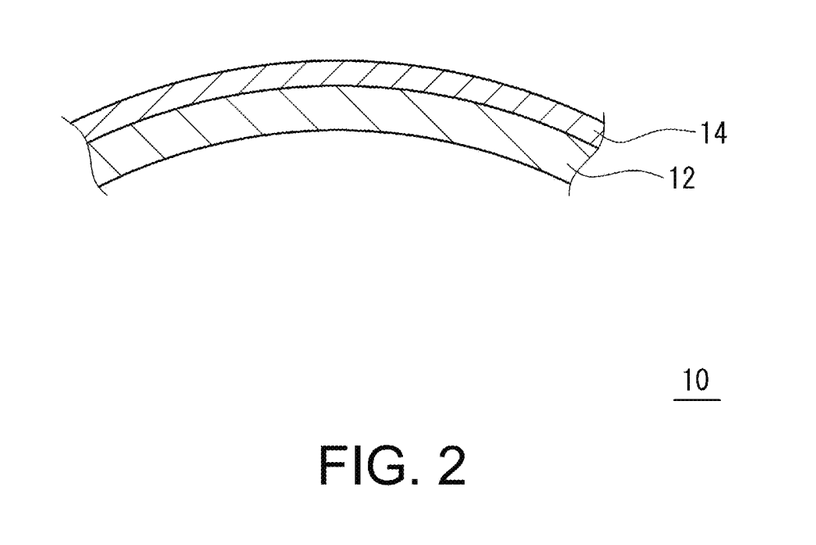
FIG. 2 is a cross-sectional view of the belt member for the electrophotographic apparatus shown in FIG. 1.

FIG. 1 illustrates a belt member according to an embodiment of the disclosure. FIG. 2 is a cross-sectional view of the belt member shown in FIG. 1.

A belt member 10 includes a base layer 12 in a tubular shape and a surface layer 14 formed on the outer circumferential surface of the base layer 12. The belt member 10 is configured as an endless belt.

The base layer 12 serves as a base material of the belt member 10. The base layer 12 is formed in a tubular shape and has a seamless structure without joints in the circumferential direction. The base layer 12 includes at least one of polyimide and polyamideimide. Polyimide and polyamideimide may be modified with functional groups. With excellent rigidity and durability, polyimide and polyamideimide can be suitably used as forming materials of the base layer 12 of the belt member 10. In particular, the base layer 12 may be formed by using polyimide. As long as the base layer 12 has at least one of polyimide and polyamideimide as the main component, the base layer 12 may include other components such as additives. Examples of the additives may include a conductive agent, such as carbon black or graphite, a filler such as calcium carbonate, a release agent, a flame retardant, a leveling agent, and a defoaming agent.

The thickness of the base layer 12 is not particularly limited. The thickness of the base layer 12 is preferably 50 µm or more, more preferably 60 µm or more. Additionally, it is preferably 90 µm or less, more preferably 80 µm or less.

The surface layer 14 is configured as a cured product of a resin composition containing a fluorine resin having a hydroxyl group, an isocyanate curing agent, a fluorine-based surfactant, and a silane coupling agent having an amino group or an isocyanate group.

The fluorine resin is a main component forming the surface layer 14 and serves as a binder polymer. The fluorine resin is not particularly limited as long as such resin can serve as a paint. Examples of such fluorine resin may include fluoroethylene vinyl ether (FEVE) copolymer, polyvinylidene fluoride (PVDF) resin, and polychlorotrifluoroethylene (PCTFE) resin, etc. The fluorine resin having a hydroxyl group can be cured by having urethane reacting with the isocyanate curing agent.

The isocyanate curing agent serves as a curing agent of the fluorine resin having a hydroxyl group. Examples of such isocyanate curing agent may include monoisocyanates and polyisocyanates. The isocyanate curing agent may have isocyanate groups (functional groups) at both ends or may have an isocyanate group (functional group) at a single end. An isocyanate curing agent that is effective in making the cured product flexible may be used.

For the isocyanate curing agent having isocyanate groups at both ends, one with a relatively large molecular weight may be used. In particular, the longer the distance between a crosslink, the greater the isocyanate curing agent can make contribution to the flexibility of the cured product. From the perspective, in the isocyanate curing agent having isocyanate groups at both ends, the molecular weight is preferably 600 g/mol or more. More preferably, the molecular weight is 1000 g/mol or more, even more preferably 1500 g/mol or more, and particularly preferably 2000 g/mol or more. Meanwhile, if the molecular weight of the isocyanate curing agent having isocyanate groups at both ends is too large, the sliding noise of the cleaning blade tends to increase. Therefore, the molecular weight of the isocyanate curing agent having isocyanate groups at both ends is preferably 4000 g/mol or less. More preferably, the molecular weight is 3500 g/mol or less, and even more preferably 3000 g/mol or less. The molecular weight of the isocyanate curing agent is represented as the number average molecular weight of an oligomer or a polymer.

As the isocyanate curing agent having isocyanate groups at both ends, a urethane prepolymer having an NCO terminal obtained by reacting polyisocyanate with polyol may be used.

Examples of such polyisocyanate may include diphenylmethane diisocyanate (MDI), polymethylene polyphenylene polyisocyanate (polymeric MDI), crude MDI (c-MDI) as a mixture of MDI and polymeric MDI, dicyclohexylmethane diisocyanate (hydrogenated MDI), tolylene diisocyanate (TDI), hexamethylene diisocyanate (HDI), trimethylhexamethylene diisocyanate (TMHDI), isophorone diisocyanate (IPDI), ortho-toluidine diisocyanate (TODI), naphthalene diisocyanate (NDI), xylylene diisocyanate (XDI), para-phenylene diisocyanate (PDI), lysine diisocyanate methyl ester (LDI), dimethyl diisocyanate (DDI), oligomer such as MDI nurate, HDI nurate, TDI nurate, and a modified version of those obtained by urethanization, biuretization, allophanatization, carbodiimidization, urethanization, etc. As the polyisocyanate, aliphatic polyisocyanate such as HDI is preferred from the perspective of imparting of flexibility, case of reaction, etc.

Examples of such polyol may include polyester polyol, polyether polyol, polycaprolactone polyol, polycarbonate polyol, etc. As the polyol, polyether polyol is particularly preferred from the perspective of stability (hydrolysis resistance), etc., in a high-temperature, high-humidity environment.

Examples of such polyester polyol may include polyethylene adipate (PEA), polybutylene adipate (PBA), polyhexylene adipate (PHA), a copolymer of ethylene adipate and butylene adipate (PEA/BA), etc.

Examples of such polyether polyol include polypropylene glycol (PPG), polytetramethylene glycol (PTMG), ethylene oxide-modified types of polyol, polyethylene glycol (PEG), etc.

Polycarbonate polyol (polycarbonate diol) may be obtained by polymerizing alkylene diol as a monomer and a low molecular weight carbonate compound. Examples of such alkylene diol as a monomer may include 1,6-hexanediol, 1,5-pentanediol, 1,4-butanediol, cyclohexanedimethanol, etc.

In the resin composition, the content of the isocyanate curing agent having isocyanate groups at both ends is 10 parts by mass or more and 30 parts by mass or less with respect to 100 parts by mass of the fluorine resin. If the content of the isocyanate curing agent having isocyanate groups at both ends is less than 10 parts by mass with respect to 100 parts by mass of the fluorine resin, the flexibility is insufficient, and wrinkles or undulations may occur in the surface layer 14 through long-term storage and use. From the perspective, the content of the isocyanate curing agent having isocyanate groups at both ends is more preferably 15 parts by mass or more. Meanwhile, if the content of the isocyanate curing agent having isocyanate groups at both ends is too high, the sliding noise of the cleaning blade increases. Therefore, the content of the isocyanate curing agent having isocyanate groups at both ends is 30 parts by mass or less with respect to 100 parts by mass of the fluorine resin. In addition, from the perspective, the content of the isocyanate curing agent having isocyanate groups at both ends is more preferably 25 parts by mass or less, and even more preferably 20 parts by mass or less.

The isocyanate curing agent having an isocyanate group at a single end does not form a crosslinked structure with respect to the fluorine resin having a hydroxyl group. Therefore, it can make the cured product flexible through urethane reaction. From the perspective, the molecular weight of the isocyanate curing agent having an isocyanate group at a single end is not particularly limited.

Examples of the isocyanate curing agent having an isocyanate group at a single end may include aliphatic or aromatic monoisocyanate.

In the resin composition, the content of the isocyanate curing agent having an isocyanate group at a single end is 5 parts by mass or more and 18 parts by mass or less with respect to 100 parts by mass of the fluorine resin. If the content of the isocyanate curing agent having an isocyanate groups at a single end is less than 5 parts by mass with respect to 100 parts by mass of the fluorine resin, the flexibility is insufficient, and wrinkles or undulations may occur in the surface layer 14 through long-term storage and use. In addition, from the perspective, the content of the isocyanate curing agent is more preferably 7 parts by mass or more. Meanwhile, if the content of the isocyanate curing agent having an isocyanate group at a single end is too high, the sliding noise of the cleaning blade increases. Therefore, the content of the isocyanate curing agent having an isocyanate groups at a single end is 18 parts by mass or less with respect to 100 parts by mass of the fluorine resin. From the perspective, the content of the isocyanate curing agent having an isocyanate group at a single end is more preferably 15 parts by mass or less.

The fluorine-based surfactant increases the surface sliding property of the surface layer 14. The fluorine-based surfactant is formed by a compound having a fluorine-containing group. The fluorine-containing group may be present in a side chain of the compound. Examples of such compound may include polymers having a fluorine-containing group, acrylic fluorine copolymers, acrylic fluorine-acrylic copolymers, acrylic fluorine-acrylic silicone-acrylic copolymers, polyfluoropolyether, and polyfluoropolyether alcohol, etc. Although not particularly limited, the polymer is preferably a (meth)acrylic polymer in view of the compatibility, etc., with the fluorine-containing paint including the fluorine resin.

Examples of the fluorine-containing group may include organic groups containing fluorine. Examples of the organic group containing fluorine may include a fluoroalkyl group having 1 to 20 carbon atoms. The fluoroalkyl group may be a perfluoroalkyl group in which all the hydrogen atoms of the alkyl group are substituted with fluorine atoms, and may also be a fluoroalkyl group in which some hydrogen atoms of the alkyl group are substituted with fluorine atoms. Among these, the perfluoroalkyl group may be adopted in view of the tendency of being distributed unevenly on the surface of the surface layer 14, etc.

Examples of such fluoroalkyl group having 1 to 20 carbon atoms may include a trifluoromethyl group, a pentafluoroethyl group, a heptafluoropropyl group, a nonafluorobutyl group, a perfluorohexyl group, a trifluoroethyl group, a pentafluoropropyl group, a heptafluorobutyl group, etc.

The (meth)acrylic polymer refers to a copolymer of (meth)acrylate, a copolymer of (meth)acrylamide, or a copolymer of (meth)acrylate and (meth)acrylamide, etc. For example, a copolymer having an organic group containing fluorine can be obtained by copolymerizing (meth)acrylate having an organic group containing fluorine with (meth)acrylate having an organic group not containing fluorine.

The (meth)acrylic polymer may include, as copolymerization components, copolymerizable unmodified (meth)acrylate or unmodified (meth)acrylamide. Examples of unmodified (meth)acrylate may include alkyl (meth)acrylate, hydroxyalkyl (meth)acrylate, etc. Examples of alkyl (meth)acrylate may include methyl (meth)acrylate, ethyl (meth)acrylate, propyl (meth)acrylate, butyl (meth)acrylate, 2-ethylhexyl (meth)acrylate, etc. Examples of hydroxyalkyl (meth)acrylate may include hydroxyethyl (meth)acrylate, hydroxypropyl (meth)acrylate, hydroxybutyl (meth)acrylate, etc. Among these, methyl (meth)acrylate may be adopted in view of copolymerization reactivity, etc.

Examples of copolymerizable unmodified (meth)acrylamide may include (meth)acrylamide, alkyl (meth)acrylamide, hydroxyalkyl (meth)acrylamide, etc. Examples of alkyl (meth)acrylamide may include methyl (meth)acrylamide, ethyl (meth)acrylamide, propyl (meth)acrylamide, butyl (meth)acrylamide, and 2-ethylhexyl (meth)acrylamide, etc. Examples of such hydroxyalkyl (meth)acrylamide may include hydroxyethyl (meth)acrylamide, hydroxypropyl (meth)acrylamide, and hydroxybutyl (meth)acrylamide, etc. Among these, methyl (meth)acrylamide may be adopted in view of copolymerization reactivity.

The fluorine content of the fluorine-based surfactant is preferably 10% by mass or more from the perspective that the fluorine-based surfactant tends to be distributed unevenly on the surface of the surface layer 14 and the excellent effect of increasing the surface sliding property. More preferably, the fluorine content is 15% by mass or more. In addition, the fluorine content of the fluorine-based surfactant is preferably 30% by mass or less from the perspective of the excellent effect of improving the appearance of the surface layer 14. More preferably, the fluorine content is 25 mass % or less. The fluorine content of the fluorine-based surfactant can be measured by conducting a GC-MS analysis, an NMR analysis, etc.

In the resin composition, the content of the fluorine-based surfactant is 5 parts by mass or more and 10 parts by mass less with respect to 100 parts by mass of the fluorine resin. If the content of the fluorine-based surfactant is less than 5 parts by mass with respect to 100 parts by mass of the fluorine resin, the effect of increasing surface sliding property is insufficient, and the sliding noise of the cleaning blade increases. In addition, from the perspective, the content of the fluorine-based surfactant is more preferably 7 parts by mass or more. On the other hand, if the content of the fluorine-based surfactant exceeds 10 parts by mass with respect to 100 parts by mass of the fluorine resin, defects occur on the coating film surface, and the appearance of the surface of the surface layer 14 deteriorates. In addition, from the perspective, the content of the fluorine-based surfactant is more preferably 8 parts by mass or less.

The silane coupling agent improves the sealing properties between the base layer 12 and the surface layer 14. The silane coupling agent has an amino group or an isocyanate group in order to form bonds with the materials of both the base layer 12 and the surface layer 14.

Examples of such (amine-based) silane coupling agent having an amino group may include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, N-(vinylbenzyl)-2-aminoethyl-3-aminopropyltrimethoxysilane, etc.

In the resin composition, the content of the silane coupling agent is 1.0 to 5 parts by mass with respect to 100 parts by mass of the fluorine resin. If the content of the silane coupling agent is less than 1.0 parts by mass with respect to 100 parts by mass of the fluorine resin, the sealing properties between the base layer 12 and the surface layer 14 is insufficient. In addition, from the perspective, the content of the silane coupling agent is more preferably 2 parts by mass or more. On the other hand, if the content of the silane coupling agent exceeds 5 parts by mass with respect to 100 parts by mass of the fluorine resin, wrinkles and undulations occur in the surface layer 14 through long-term storage and use. In addition, from the perspective, the content of the silane coupling agent is more preferably 3 parts by mass or less.

The resin composition constituting the surface layer 14 may include, in addition to the fluorine resin, the isocyanate curing agent, the fluorine-based surfactant, and the silane coupling agent, other components such as additives as appropriate. Examples of such additives may include a conductive agent, a filler, a release agent, a flame retardant, a leveling agent, and a defoaming agent.

Furthermore, it is preferable that the surface layer 14, when formed as a cured product of the resin composition, has a dynamic friction coefficient and a static friction coefficient of 0.5 or less after 500 trials of abrasion test. The dynamic friction coefficient and the static friction coefficient can be adjusted by selecting the fluorine-based surfactant, adjusting the content thereof, selecting the isocyanate curing agent, adjusting the content thereof, etc. The dynamic friction coefficient and the static friction coefficient of the surface layer 14 can be measured by using a friction-and-wear tester.

The thickness of the surface layer 14 is not particularly limited. However, by making the surface layer 14 relatively thin, the occurrence of wrinkles and undulations in the surface layer 14 during long-term storage and use can be easily suppressed. From the perspective, the thickness of the surface layer 14 is preferably 60 μm or less. More preferably, the thickness of the surface layer 14 is 50 μm or less. In addition, from the perspective of more effectively exhibiting the effect of the surface layer 14, the thickness of the surface layer 14 is preferably 20 μm or more. More preferably, the thickness of the surface layer 14 is 30 μm or more.

The belt member 10 can be manufactured as follows. Firstly, the base layer 12 is formed. The base layer 12 is formed by coating a base layer formation material arranged in the form of a paint by using an appropriate solvent, etc., to the outer circumferential surface of a tubular or columnar mold, and drying the base layer formation material. If necessary, a heat treatment may be performed. Examples of such coating method may include dip coating, dispenser coating (nozzle coating), roll coating, and ring coating. Then, the resin composition for the surface layer is coated to the surface of the formed base layer 12 and cured to form the surface layer 14. At this time, if necessary, a heat treatment can be performed to promote the curing of the resin composition. For coating of the resin composition, various processes similar to those listed above for forming the base layer 12 can be used. Finally, by removing the mold, the belt member 10 with the surface layer 14 formed on the outer circumferential surface of the base layer 12 is obtained.

According to the belt member 10 with the structure, the surface layer 14 is formed as a cured product of the resin composition including the fluorine resin having a hydroxyl group, the isocyanate curing agent, the fluorine-based surfactant, and the silane coupling agent having an amino group or an isocyanate group, with each component being mixed in a specific amount. Therefore, the occurrence of wrinkles and undulations during long-term storage and use is suppressed, the sliding noise of the cleaning blade is reduced, the appearance is favorable, and the sealing properties between the surface layer 14 and the base layer 12 are favorable.

In the resin composition, the isocyanate curing agent contributes to the flexibility of the surface layer 14. Accordingly, wrinkles and undulations during long-term storage and use can be suppressed. When the isocyanate curing agent has isocyanate groups at both ends and the molecular weight thereof is 600 g/mol or more and 4000 g/mol or less, the surface layer 14 becomes flexible, and the occurrence of wrinkles and undulations during long-term storage and use can be suppressed. Additionally, when the isocyanate curing agent has an isocyanate group at a single end, the surface layer 14 becomes flexible, and the occurrence of wrinkles and undulations during long-term storage and use can be suppressed.

In the resin composition, the fluorine-based surfactant contributes to the surface sliding property. Accordingly, the effect of sliding noise of the cleaning blade is enhanced. Moreover, when the fluorine content of the fluorine-based surfactant is 10% by mass or more and 30% by mass or less, the sliding property of the surface layer 14 is increased, resulting in an excellent effect of suppressing the sliding noise of the cleaning blade. Although the surface sliding property may deteriorate due to the increased flexibility of the surface layer 14, since the fluorine-based surfactant that increase the surface sliding property is provided in the resin composition, the deterioration of the surface sliding property caused by the increased flexibility of the surface layer 14 is suppressed.

In the resin composition, the silane coupling agent contributes to the sealing properties between the surface layer 14 and the base layer 12. Although the silane coupling agent may deteriorate the flexibility of the surface layer 14, since the isocyanate curing agent that increases the flexibility of the surface layer 14 is provided in the resin composition, the deterioration of the flexibility caused by the silane coupling agent is suppressed, and the occurrence of wrinkles and undulations can be prevented during long-term storage and use.

EXAMPLES

The disclosure will be described in detail below using examples and comparative examples. The disclosure is not limited by the following examples.

<Synthesis of Fluorine-Based Surfactant>

The raw materials with the composition shown in Table 1 and methyl isobutyl ketone (MIBK) were added to a 0.5 L flask so that the solid content became 50%. After nitrogen bubbling was performed for 5 minutes while stirring the contents of the flask, the temperature of the internal liquid was maintained at 100° C., and the polymerization reaction was carried out for 10 hours. Subsequently, MIBK was added to the flask so that the solid content becomes 30%, and copolymer solutions were obtained as fluorine-based surfactants <1> to <5>.

The following raw materials were used for the synthesis of fluorine-based surfactants. The fluorine concentration (F concentration) is the concentration calculated from the usage amount of each raw material.

MMA: Methyl methacrylate (manufactured by Tokyo Chemical Industry Co., Ltd.) (molecular weight: 100.12)

BMA: Butyl methacrylate (manufactured by Tokyo Chemical Industry Co., Ltd.) (molecular weight: 128.17)

2-(Perfluorohexyl)ethyl acrylate (manufactured by Daikin Chemical Sales Co., Ltd.) (molecular weight: 418.15).

Initiator (radical polymerization initiator): 1,1'-azobis(cyclohexane-1-carbonitrile) (manufactured by FUJIFILM Wako Pure Chemical Corporation) (molecular weight: 244.34)

TABLE 1

| | MMA (g) | BMA (g) | F-containing acrylate * (g) | Initiator (g) | F concentration (wt %) |
|---|---|---|---|---|---|
| Fluorine-based surfactant <1> | 83.08 | — | 16.92 | 8.51 | 10 |
| Fluorine-based surfactant <2> | 66.15 | — | 33.85 | 7.26 | 20 |
| Fluorine-based surfactant <3> | 57.69 | — | 42.31 | 6.63 | 25 |
| Fluorine-based surfactant <4> | 49.23 | — | 50.77 | 6.00 | 30 |
| Fluorine-based surfactant <5> | — | 57.69 | 42.31 | 8.55 | 25 |

* F-containing acrylate: 2-(Perfluorohexyl)ethyl acrylate

<Synthesis of Isocyanate Curing Agent <5>>

A 4-neck flask equipped with a stirrer, a thermometer, a reflux cooling pipe, a nitrogen blowing pipe, and a dropping funnel was filled with a nitrogen atmosphere. 60 g of hexamethylene diisocyanate (HDI, manufactured by Tokyo Chemical Industry Co., Ltd.) and 62.5 g of bifunctional polyether polyol (PREMINOL G-5000 manufactured by AGC Inc., number average molecular weight 5000) (equivalent ratio of isocyanate group/hydroxyl group=30/1) were added to the flask. The mixture was stirred under the nitrogen atmosphere, and the temperature inside the reactor was maintained at 160° C. for 3 hours. Subsequently, the temperature of the reaction liquid was lowered, and unreacted HDI was removed by using a thin film evaporator. The number average molecular weight of the obtained two-end isocyanate polymer (the isocyanate curing agent <5>) was 5000.

Other materials used for forming the surface layer are as follows.

Fluorine resin: "Kanpe Flon EX" manufactured by Kansai Paint Co., Ltd.

Isocyanate curing agent <1>: "Adiprene BL-16" manufactured by Uniroyal (number average molecular weight 2000-3000)

Isocyanate curing agent <2>: "Coronate 2412" manufactured by Nippon Polyurethane Industry Co., Ltd. (number average molecular weight 600-2000)

Isocyanate curing agent <3>: "Millionate O" manufactured by Hodogaya Chemical Co., Ltd. (molecular weight 296)

Isocyanate curing agent <4>: "Burnock DB-980K" manufactured by DIC Corporation (molecular weight 504)

Silane coupling agent: "KBM-903" manufactured by Shin-Etsu Chemical Co., Ltd.

<Preparation of Surface Layer Forming Composition>

The surface layer forming composition was prepared by mixing each component in the mass parts shown in Tables 2 to 4.

<Fabrication of Belt Member>

A coating liquid containing polyimide (HCI-1300 manufactured by Hitachi Chemical Co., Ltd.) was coated to the surface of a cylindrical mold by dip coating, and heated at 120° C. for 30 minutes, 150° C. for 10 minutes, 200° C. for 10 minutes, 250° C. for 10 minutes, and 350° C. for 10 minutes to form a base layer (with a thickness of 70 μm). Subsequently, the surface layer forming composition was coated to the surface of the base layer by dipping, and heated and cured at 160° C. for 30 minutes to form a surface layer with the thickness described in Tables 2 to 4. Then, the belt member was fabricated by removing the mold.

The fabricated belt member was evaluated for undulation, sliding noise, appearance, and sealing properties. Additionally, the friction coefficient of the surface of the fabricated belt member was measured.

(Undulation)

The fabricated belt member was set in a paper transport unit (WF-C20590 manufactured by Seiko Epson Corporation) and left for 5 days in an environment of 32.5° C. and 90% RH. Subsequently, the belt member was rotated by ¼ turn, and the height of the undulation that had occurred at the position where the rotation axis had been in contact before rotation was evaluated. The belt member was rated as "⊚" if the height was 0.7 mm or less, "○" if the height was more than 0.7 mm and 0.9 mm or less, and "x" if the height was more than 0.9 mm.

(Sliding Noise)

The fabricated belt member was set in a paper transport unit (WF-C20590 manufactured by Seiko Epson Corporation) and rotated at a circumferential speed of 420 mm/sec. The sliding noise due to contact with the cleaning blade was evaluated as follows: "⊚" if no sliding noise had occurred for 250 hours or more, "○" if sliding noise had occurred between 200 hours and less than 250 hours, and "x" if sliding noise had occurred within 200 hours.

(Appearance)

In the process of fabricating the belt member, when the surface layer forming composition was coated to the base layer and subjected to a curing reaction at 160° C. for 30 minutes, the appearance was rated as "x" if a defect had occurred on the surface of the coating film, and "○" if no defects (repelling, cracking, wrinkling, bubbles, bleeding) had occurred.

(Sealing Properties)

A grid of 50 squares of 1 mm×1 mm was cut into the surface layer of the belt member, and an adhesive tape (P-422 manufactured by Nitto Denko Corporation) was applied. When only the tape was peeled off, the sealing properties were rated as "⊚" if there was no peeling of the grid squares on the surface layer, "○" if the number of peeled grid squares was 1, and "x" if the number of peeled grid squares was 2 or more (cross-cut method).

(Friction Coefficient)

The belt member was set on the base of a friction-and-wear tester (Triboster 500 manufactured by Kyowa Interface Science Co., Ltd.), and a wear test was conducted for 500 times at a speed of 2.5 mm/s by using a metal wire indenter on the surface layer side of the belt member. The static friction coefficient and dynamic friction coefficient were measured at the 500$^{th}$ trial.

TABLE 2

| | | Molecular Weight | Functional Group Position | F Content (wt %) | Example | | | | | | |
|---|---|---|---|---|---|---|---|---|---|---|---|
| | | | | | 1 | 2 | 3 | 4 | 5 | 6 | 7 |
| Composition | Fluorine resin | | | | 100 | 100 | 100 | 100 | 100 | 100 | 100 |
| | Isocyanate curing agent <1> | 2000-3000 | Both ends | | 15 | 10 | 15 | 15 | 15 | 15 | 30 |
| | Isocyanate curing agent <2> | 600-2000 | Both ends | | — | — | — | — | — | — | — |

TABLE 2-continued

| | | Molecular Weight | Functional Group Position | F Content (wt %) | Example 1 | 2 | 3 | 4 | 5 | 6 | 7 |
|---|---|---|---|---|---|---|---|---|---|---|---|
| | Isocyanate curing agent <3> | 296 | Single end | | — | — | — | — | — | — | — |
| | Isocyanate curing agent <4> | 504 | Both ends | | — | — | — | — | — | — | — |
| | Isocyanate curing agent <5> | 5000 | Both ends | | — | — | — | — | — | — | — |
| | Fluorine-based surfactant <1> | | | 10 | — | — | 10 | — | — | — | — |
| | Fluorine-based surfactant <2> | | | 20 | 10 | 10 | — | — | — | — | 10 |
| | Fluorine-based surfactant <3> | | | 25 | — | — | — | 10 | — | — | — |
| | Fluorine-based surfactant <4> | | | 30 | — | — | — | — | 10 | — | — |
| | Fluorine-based surfactant <5> | | | 25 | — | — | — | — | — | 10 | — |
| | Silane coupling agent | | | | 1.0 | 1.0 | 1.0 | 1.0 | 1.0 | 1.0 | 1.0 |
| | Dynamic friction coefficient | | | | 0.20 | 0.30 | 0.23 | 0.18 | 0.15 | 0.20 | 0.25 |
| | Static friction coefficient | | | | 0.40 | 0.50 | 0.45 | 0.35 | 0.30 | 0.40 | 0.50 |
| | Film thickness (μm) | | | | 45 | 45 | 45 | 45 | 45 | 45 | 45 |
| Evaluation | Undulation | | | | ◎ | ○ | ◎ | ◎ | ◎ | ◎ | ◎ |
| | Sliding noise | | | | ◎ | ◎ | ◎ | ◎ | ◎ | ◎ | ○ |
| | Appearance | | | | ○ | ○ | ○ | ○ | ○ | ○ | ○ |
| | Sealing properties | | | | ○ | ○ | ○ | ○ | ○ | ○ | ○ |

TABLE 3

| | | Molecular Weight | Functional Group Position | F Content (wt %) | Example 8 | 9 | 10 | 11 | 12 | 13 | 14 | 15 |
|---|---|---|---|---|---|---|---|---|---|---|---|---|
| Composition | Fluorine resin | | | | 100 | 100 | 100 | 100 | 100 | 100 | 100 | 100 |
| | Isocyanate curing agent <1> | 2000-3000 | Both ends | | 15 | 15 | — | — | — | — | 15 | 15 |
| | Isocyanate curing agent <2> | 600-2000 | Both ends | | — | — | 15 | 30 | — | — | — | — |
| | Isocyanate curing agent <3> | 296 | Single end | | — | — | — | — | 5 | 18 | — | — |
| | Isocyanate curing agent <4> | 504 | Both ends | | — | — | — | — | — | — | — | — |
| | Isocyanate curing agent <5> | 5000 | Both ends | | — | — | — | — | — | — | — | — |
| | Fluorine-based surfactant <1> | | | 10 | — | — | — | — | — | — | — | — |
| | Fluorine-based surfactant <2> | | | 20 | 10 | 10 | 10 | 10 | 10 | 10 | 5 | 10 |
| | Fluorine-based surfactant <3> | | | 25 | — | — | — | — | — | — | — | — |
| | Fluorine-based surfactant <4> | | | 30 | — | — | — | — | — | — | — | — |
| | Fluorine-based surfactant <5> | | | 25 | — | — | — | — | — | — | — | — |
| | Silane coupling agent | | | | 1.0 | 1.0 | 1.0 | 1.0 | 1.0 | 1.0 | 1.0 | 5.0 |
| | Dynamic friction coefficient | | | | 0.20 | 0.20 | 0.17 | 0.23 | 0.13 | 0.30 | 0.30 | 0.15 |
| | Static friction coefficient | | | | 0.40 | 0.40 | 0.35 | 0.42 | 0.35 | 0.50 | 0.50 | 0.30 |
| | Film thickness (μm) | | | | 20 | 60 | 45 | 45 | 45 | 45 | 45 | 45 |
| Evaluation | Undulation | | | | ◎ | ○ | ○ | ◎ | ○ | ◎ | ◎ | ○ |
| | Sliding noise | | | | ◎ | ◎ | ◎ | ○ | ◎ | ○ | ○ | ◎ |
| | Appearance | | | | ○ | ○ | ○ | ○ | ○ | ○ | ○ | ○ |
| | Sealing properties | | | | ○ | ○ | ○ | ○ | ○ | ○ | ○ | ○ |

TABLE 4

| | | Molecular Weight | Functional Group Position | F Content (wt %) | Comparative Example 1 | 2 | 3 | 4 | 5 | 6 |
|---|---|---|---|---|---|---|---|---|---|---|
| Composition | Fluorine resin | | | | 100 | 100 | 100 | 100 | 100 | 100 |
| | Isocyanate curing agent <1> | 2000-3000 | Both ends | | 5 | 50 | — | — | — | 15 |
| | Isocyanate curing agent <2> | 600-2000 | Both ends | | — | — | — | — | — | — |
| | Isocyanate curing agent <3> | 296 | Single end | | — | — | — | — | 20 | — |
| | Isocyanate curing agent <4> | 504 | Both ends | | — | — | 15 | — | — | — |
| | Isocyanate curing agent <5> | 5000 | Both ends | | — | — | — | 15 | — | — |
| | Fluorine-based surfactant <1> | | | 10 | — | — | — | — | — | — |
| | Fluorine-based surfactant <2> | | | 20 | 10 | 10 | 10 | 10 | 10 | 1 |
| | Fluorine-based surfactant <3> | | | 25 | — | — | — | — | — | — |
| | Fluorine-based surfactant <4> | | | 30 | — | — | — | — | — | — |
| | Fluorine-based surfactant <5> | | | 25 | — | — | — | — | — | — |

TABLE 4-continued

|  |  |  |  |  |  |  |  |  |
|---|---|---|---|---|---|---|---|---|
|  | Silane coupling agent |  |  | 1.0 | 1.0 | 1.0 | 1.0 | 1.0 | 1.0 |
|  | Dynamic friction coefficient |  |  | 0.13 | 0.40 | 0.18 | 0.35 | 0.40 | 0.30 |
|  | Static friction coefficient |  |  | 0.25 | 0.80 | 0.35 | 0.70 | 0.80 | 0.60 |
|  | Film thickness (μm) |  |  | 45 | 45 | 45 | 45 | 45 | 45 |
| Evaluation | Undulation |  |  | X | ◎ | X | ◎ | ◎ | ◎ |
|  | Sliding noise |  |  | ◎ | X | ◎ | X | X | X |
|  | Appearance |  |  | ○ | ○ | ○ | ○ | ○ | ○ |
|  | Sealing properties |  |  | ○ | ○ | ○ | ○ | ○ | ○ |

|  |  | Molecular Weight | Functional Group Position | F Content (wt %) | Comparative Example | | | | |
|---|---|---|---|---|---|---|---|---|---|
|  |  |  |  |  | 7 | 8 | 9 | 10 | 11 |
| Composition | Fluorine resin |  |  |  | 100 | 100 | 100 | 100 | 100 |
|  | Isocyanate curing agent <1> | 2000-3000 | Both ends |  | 15 | 15 | 15 | 15 | 15 |
|  | Isocyanate curing agent <2> | 600-2000 | Both ends |  | — | — | — | — | — |
|  | Isocyanate curing agent <3> | 296 | Single end |  | — | — | — | — | — |
|  | Isocyanate curing agent <4> | 504 | Both ends |  | — | — | — | — | — |
|  | Isocyanate curing agent <5> | 5000 | Both ends |  | — | — | — | — | — |
|  | Fluorine-based surfactant <1> |  |  | 10 | — | — | — | — | — |
|  | Fluorine-based surfactant <2> |  |  | 20 | 15 | 10 | 10 | — | 10 |
|  | Fluorine-based surfactant <3> |  |  | 25 | — | — | — | — | — |
|  | Fluorine-based surfactant <4> |  |  | 30 | — | — | — | — | — |
|  | Fluorine-based surfactant <5> |  |  | 25 | — | — | — | — | — |
|  | Silane coupling agent |  |  |  | 1.0 | 0.5 | 7.0 | 1.0 | — |
|  | Dynamic friction coefficient |  |  |  | 0.18 | 0.25 | 0.18 | 0.60 | 0.20 |
|  | Static friction coefficient |  |  |  | 0.35 | 0.50 | 0.35 | 0.90 | 0.40 |
|  | Film thickness (μm) |  |  |  | 45 | 45 | 45 | 45 | 45 |
| Evaluation | Undulation |  |  |  | ◎ | ◎ | X | ◎ | ◎ |
|  | Sliding noise |  |  |  | ◎ | ◎ | ◎ | X | ◎ |
|  | Appearance |  |  |  | X | ○ | ○ | ○ | ○ |
|  | Sealing properties |  |  |  | ○ | X | ○ | ○ | X |

In Comparative Example 1, the content of the isocyanate curing agent in the surface layer forming composition was too little, resulting in undulations on the surface of the belt member. In Comparative Example 2, the content of the isocyanate curing agent in the surface layer forming composition was too much, and the sliding noise was not suppressed. In Comparative Example 3, the isocyanate curing agent in the surface layer forming composition contained functional groups at both ends, and due to the small molecular weight thereof, undulations occurred on the surface of the belt member. In Comparative Example 4, the isocyanate curing agent in the surface layer forming composition contained functional groups at both ends, and due to the large molecular weight thereof, the sliding noise was not suppressed. In Comparative Example 5, the isocyanate curing agent in the surface layer forming composition contained a functional group at a single end, and the content of the isocyanate curing agent was too high, so the sliding noise was not suppressed.

In Comparative Example 6, the content of the fluorine-based surfactant in the surface layer forming composition was low, resulting in a reduced effect of facilitating surface sliding property, and the sliding noise was not suppressed. In Comparative Example 7, the content of the fluorine-based surfactant in the surface layer forming composition was high, so defects occurred on the coating film surface during surface layer formation and the appearance was poor. In Comparative Example 8, the content of the silane coupling agent in the surface layer forming composition was low, resulting in poor sealing properties between the base layer and the surface layer. In Comparative Example 9, the content of the silane coupling agent in the surface layer forming composition was high, causing undulations on the surface of the belt member. In Comparative Example 10, the surface layer forming composition did not contain a fluorine-based surfactant, so the surface sliding property was poor and sliding noise was not suppressed. In Comparative Example 11, the surface layer forming composition did not contain a silane coupling agent, so the sealing properties between the base layer and the surface layer were poor.

Meanwhile, in the examples, the surface layer forming composition contained the fluorine resin having a hydroxyl group, the isocyanate curing agent, the fluorine-based surfactant, and the silane coupling agent having an amino group or an isocyanate group, with each component present in specific amounts. The isocyanate curing agent either had isocyanate groups at both ends with a molecular weight of 600 g/mol or more and 4000 g/mol or less, or had an isocyanate group at a single end. According to the examples, the occurrence of undulations on the surface of the belt member was suppressed, the sliding noise of the cleaning blade was reduced, no defects were observed on the coating film surface during surface layer formation, the appearance was good, and the sealing properties between the surface layer and the base layer were excellent.

From Examples 1, 2, and 7, it is evident that when the content of the isocyanate curing agent having isocyanate groups at both ends was 15 to 25 parts by mass with respect to 100 parts by mass of the fluorine resin, the effect of suppressing undulations on the surface of the belt member was excellent. Additionally, from Examples 1, 8, and 9, it is clear that when the thickness of the surface layer was 20 μm or more and 50 μm or less, the effect of suppressing undulations on the surface of the belt member was excellent. Furthermore, from Examples 1, 10 and Comparative Examples 3, 4, it is evident that when the molecular weight of the isocyanate curing agent having isocyanate groups at both ends was 2000 to 4000, the effects of suppressing undulations on the surface of the belt member and reducing the sliding noise were excellent.

As described above, while the embodiments of the disclosure have been explained in detail, the disclosure is not limited to the embodiments, and various modifications are possible within the scope that does not deviate from the gist of the disclosure.

What is claimed is:

1. A belt member for an electrophotographic apparatus, comprising a base layer and a surface layer, the base layer having a tubular shape, and the surface layer being formed on an outer circumferential surface of the base layer,
    wherein the base layer contains at least one of polyimide and polyamideimide,
    the surface layer is configured as a cured product of a resin composition containing a fluorine resin having a hydroxyl group, an isocyanate curing agent, a fluorine-based surfactant, and a silane coupling agent having an amino group or an isocyanate group,
    the isocyanate curing agent has isocyanate groups at both ends and has a molecular weight of 600 g/mol or more and 4000 g/mol or less, and
    with respect to 100 parts by mass of the fluorine resin, the isocyanate curing agent is 10 parts by mass or more and 30 parts by mass or less, the fluorine-based surfactant is 5 parts by mass or more and 10 parts by mass or less, and the silane coupling agent is 1.0 parts by mass or more and 5 parts by mass or less.

2. The belt member as claimed in claim 1, wherein a fluorine content of the fluorine-based surfactant is 10% by mass or more and 30% by mass or less.

3. The belt member as claimed in claim 1, wherein a dynamic friction coefficient and a static friction coefficient after 500 trials of abrasion test are 0.5 or less.

4. The belt member as claimed in claim 1, wherein a fluorine content of the fluorine-based surfactant is 10% by mass or more and 30% by mass or less, and a dynamic friction coefficient and a static friction coefficient after 500 trials of abrasion test are 0.5 or less.

5. A belt member for an electrophotographic apparatus, comprising a base layer and a surface layer, the base layer having a tubular shape, and the surface layer being formed on an outer circumferential surface of the base layer,
    wherein the base layer contains at least one of polyimide and polyamideimide,
    the surface layer is configured as a cured product of a resin composition containing a fluorine resin having a hydroxyl group, an isocyanate curing agent, a fluorine-based surfactant, and a silane coupling agent having an amino group or an isocyanate group,
    the isocyanate curing agent has an isocyanate group at a single end, and
    with respect to 100 parts by mass of the fluorine resin, the isocyanate curing agent is 5 parts by mass or more and 18 parts by mass or less, the fluorine-based surfactant is 5 parts by mass or more and 10 parts by mass or less, and the silane coupling agent is 1.0 parts by mass or more and 5 parts by mass or less.

6. The belt member as claimed in claim 5, wherein a fluorine content of the fluorine-based surfactant is 10% by mass or more and 30% by mass or less.

7. The belt member as claimed in claim 5, wherein a dynamic friction coefficient and a static friction coefficient after 500 trials of abrasion test are 0.5 or less.

8. The belt member as claimed in claim 5, wherein a fluorine content of the fluorine-based surfactant is 10% by mass or more and 30% by mass or less, and a dynamic friction coefficient and a static friction coefficient after 500 trials of abrasion test are 0.5 or less.

* * * * *